Patented Sept. 9, 1924.

1,507,565

UNITED STATES PATENT OFFICE.

JEAN ALTWEGG AND JEAN COLLARDEAU, OF LYON, FRANCE, ASSIGNORS TO SOCIETE CHIMIQUE DES USINES DU RHONE (ANCIENNEMENT GILLARD P. MONNET ET CARTIER), OF PARIS, FRANCE.

PROCESS FOR THE PREPARATION OF SACCHARIN.

No Drawing. Application filed February 24, 1921. Serial No. 447,566.

*To all whom it may concern:*

Be it known that we, JEAN ALTWEGG and JEAN COLLARDEAU, both of Lyon, France, citizens of the Confederation of Switzerland and of the Republic of France, respectively, have invented a certain new and useful Process for the Preparation of Saccharin, of which the following is a specification.

This invention relates to the manufacture of saccharin, the object of the invention being to provide an improved process for the manufacture of saccharin which depends upon the oxidation of ortho-toluene sulphamide by chromosulphuric acid.

We have discovered that considerably improved yields of the transformed amide and also a more complete utilization of the oxidizing agent are obtained by the addition of iron, chromium, manganese or their compounds. Chromium sulphate is particularly suited for this purpose.

In a manner of carrying out this process, which is very advantageous technically, the said chromium sulphate solution, which is obtained as a by-product according to the process described in the main patent, is standardized to the desired strength with concentrated sulphuric acid and then the procedure of the main patent is carried out.

It is understood that the chromic acid can be produced within the solution itself by the action of a bichromate on the sulphuric acid present in the solution.

According to the process thus modified yields of saccharin can be obtained which compared to the quantity of transformed amide approximate very closely to the theory. More than $\frac{4}{5}$ths of the oxygen available in the chromic acid employed is utilized.

*Example I.*—To 140 grammes of sulphuric acid (62.5%) 30 grammes of sodium bichromate and 3 grammes of iron sulphate are added. After well stirring 16 grammes of ortho-toluene sulphamide are added and stirred for 12 hours at a temperature from 30° to 60° C. the solution is then poured into water and the unaltered amide is separated as usual.

*Example II.*—375 parts by weight of sulphuric acid (75%) is mixed with 125 parts of an acid chromium sulphate solution obtained from the oxidation of ortho toluene sulphamide with bichromate and sulphuric acid and a mixture of 120 parts of sodium bichromate and 80 parts of ortho-toluene sulphamide is added. The mixture is well stirred at a temperature of about 30° until the colour of the mixture becomes pure green. When the reaction is completed, the product is poured into 500 parts of water and the insoluble saccharin is collected by filtration. To separate it from the non-transformed ortho-toluene-sulphamide which is present, the mixture is treated with an aqueous solution of sodium carbonate, the solution is filtered and the pure ortho-benzoic sulphamide is precipitated with a mineral acid.

What we claim and desire to secure by Letters Patent is:—

1. A process of manufacture of saccharin consisting in the oxidation of ortho-toluene-sulphamide by a mixture of sulphuric acid of more than 50% concentration with chromic acid in the presence of a compound of the ferro-chrome-manganese group.

2. The process of manufacturing saccharin, which consists in subjecting ortho-toluene-sulphamide to the action of a mixture of sulphuric acid of more than 50% concentration, sodium bichromate, and iron sulphate, stirring the mixture and maintaining it at a temperature of at least 30° C., and separating the amide therefrom.

3. The process of manufacturing saccharin, which consists in mixing together sulphuric acid of more than 50% concentration, sodium bichromate, and iron sulphate in the approximate proportions, by weight, of 140, 30, and 3 respectively, adding ortho-toluene-sulphamide to said mixture, stirring the mixture and maintaining it at a temperature of not less than 30° C., and separating the amide therefrom.

In testimony whereof we have signed our names to this specification.

JEAN ALTWEGG.
JEAN COLLORDEAU.

Witnesses:
JULIAN DEMBLE TIVCHARG,
GREDA GORBITT.